United States Patent Office 3,333,703
Patented Aug. 1, 1967

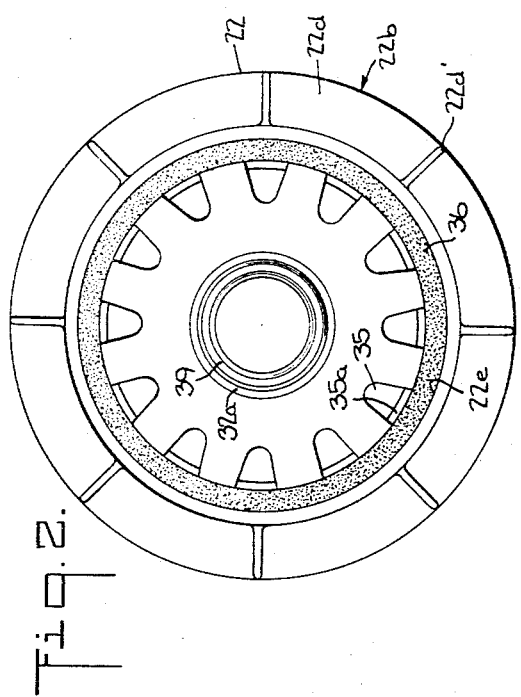
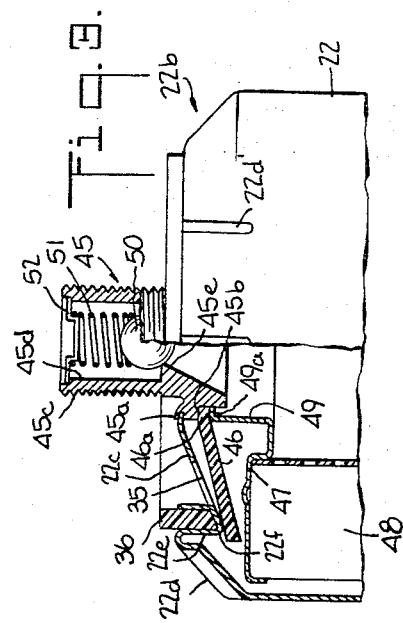
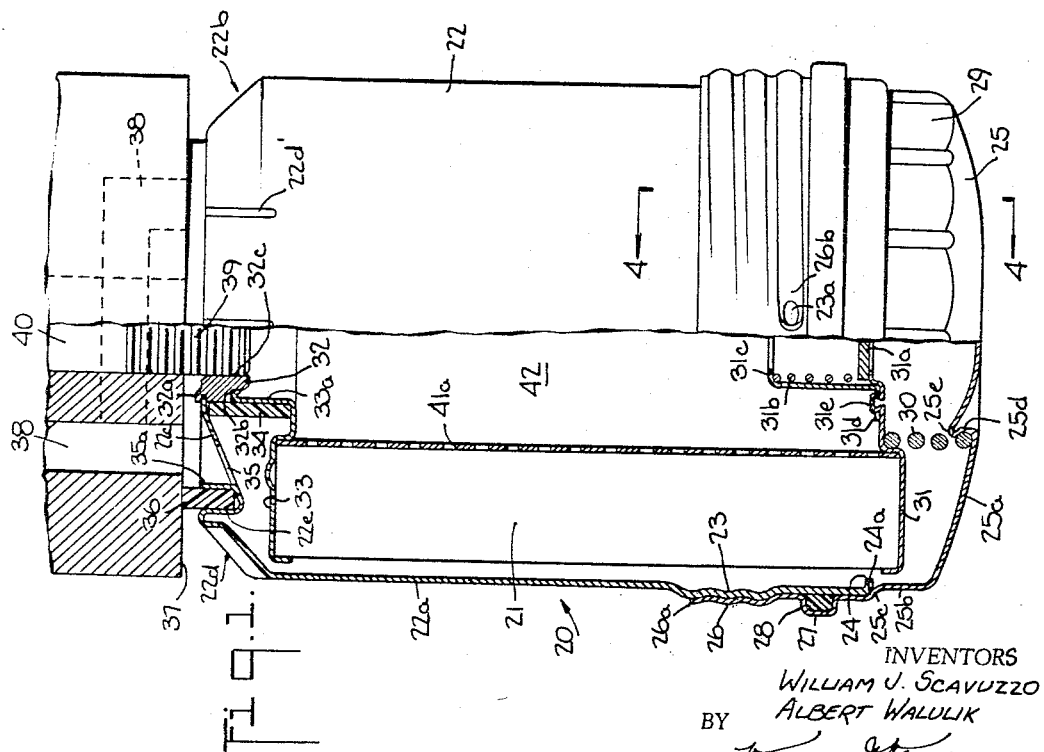
INVENTORS
WILLIAM J. SCAVUZZO
ALBERT WALULIK
BY Kenyon & Kenyon
ATTORNEYS

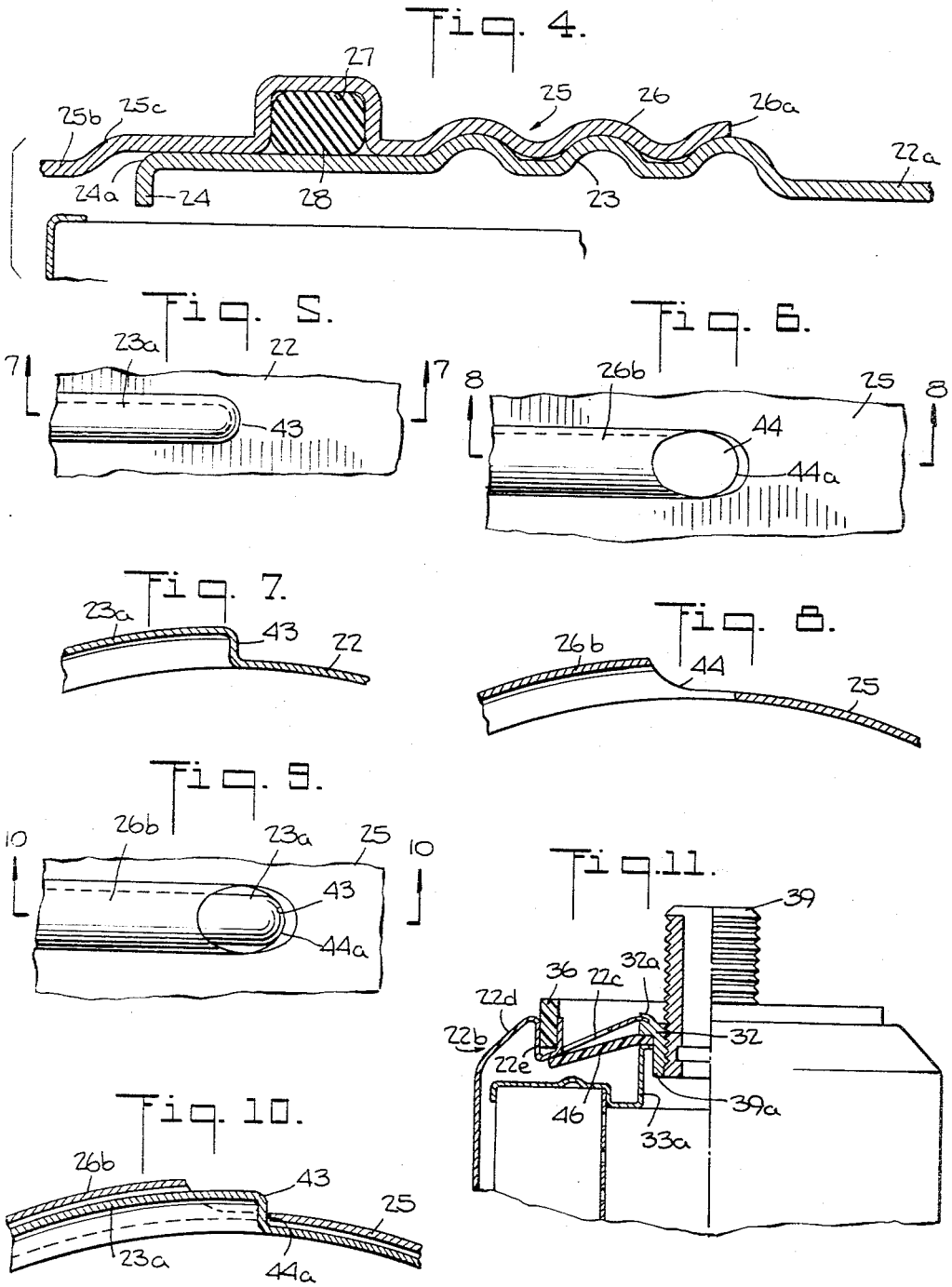

3,333,703
FILTER HOUSING
William J. Scavuzzo, Clark, and Albert Walulik, Cranford, N.J., assignors to Purolator Products, Inc., Rahway, N.J., a corporation of Delaware
Filed June 12, 1963, Ser. No. 287,237
4 Claims. (Cl. 210—232)

This invention relates to a housing for a filter device and more particularly to a housing comprising a case adapted to receive the filter device and a cover threadedly engaged to the case.

An extensive field of application for filters is that related to internal combustion engines. With respect to internal combustion engines and especially those used in the automotive field, it is common practice to provide the engine with a device for filtering the lubricating oil. During operation the lubricating oil is forced through the filter which serves to remove particles of foreign material, contaminants and the like, and then returns the filtered oil to the crankcase of the engine. One form of filter that has commonly been used for filtering lubricating oil is the cartridge-type filter. The cartridge-type filter requires a filter housing which is connected to the oil system of the engine. The cartridge is disposed in the case of the housing and a cover closes the opening of the case. To prevent leakage the cover is provided with a gasket which engages the edge of the case adjacent to the opening. The installation is completed by clamping the cover to the case by means of a bolt.

A difficulty encountered with the cartridge-type filter is that of insuring that the seal is properly seated in the cover and properly engaged with the edge of the case during assembly. Failure to do this can lead to a loss of the lubricant which can quickly lead to destruction of the engine. Due to the need to exert a substantially heavy clamping force upon the cover to force it tightly onto the seal, the filter housing is normally constructed from heavy gauge metal. This fact of course makes fabrication more difficult and costly. In addition the use of a bolt to urge the cover onto the seal results in a concentrated load being applied to the center of the cover which can distort it. Furthermore, the use of a cover bolt makes it necessary to provide a member within the case to engage the threads of the bolt and thereby develop the clamping force.

In recent years throwaway filters have been commonly used. In these devices the filter element and housing are an integral unit which is attached to the engine and after its service life, the entire unit is replaced. Since the throwaway filter includes the housing in addition to the other parts of a filter, its cost is normally greater than that of the replaceable cartridge of the cartridge-type filter. Thus wherever the economic factor is a significant one, the throwaway filter may not be a satisfactory substitution for the cartridge-type filter.

It is therefore an object of the invention to provide a housing for a filter device in which the cover is threadedly engaged to the container in which the filter device is disposed.

It is another object of the invention to provide a filter housing having a relatively thin wall thickness.

An additional object of the invention is to provide the cover with a seal which engages the outer surface of the container when the cover is installed.

A further object of the invention is to limit the extent of the threaded engagement of the cover to the container.

Still a further object of the invention is to provide an arrangement indicating when the cover is fully engaged to the container.

In one embodiment of the invention the housing for a filter device comprises structure forming a container adapted to receive the filter device within its interior portion. The container has an opening to provide access to the interior portion. Means are provided for passing a flow of fluid to be filtered with respect to the interior of the container. The portion of the outer surface of the container adjacent to the opening is threaded. The housing further includes a cover for closing the opening. The inner surface of the cover is threaded for engagement to the threaded portion of the container.

In another embodiment both the container and the cover are provided with rolled threads for securing the cover to the container.

In still another embodiment the threaded cover and case are formed from material having a relatively thin wall thickness.

In an additional embodiment the cover is provided with a flange portion having an annular groove in which is disposed a seal for sealing the cover to the outer surface of the container.

In another embodiment both the cover and the container are provided with a stop arrangement for limiting the extent of the threaded engagement of the cover to the container.

In a further embodiment the end portion of the thread of the cover is provided with an opening to indicate when the cover is fully engaged to the container.

Various other objects and advantages of the present invention will be readily apparent from the following detailed description when considered in connection with the accompanying drawings in which:

FIG. 1 is a partial vertical section view of the filter housing of the invention;

FIG. 2 is a plan view of the base portion of the filter housing showing its fluid passages;

FIG. 3 is a fragmentary partial vertical section view of the base portion of the filter housing showing the antidrain back valve provisions;

FIG. 4 is an enlarged fragmentary vertical section view taken along line 4—4 in FIG. 1 and showing the rolled thread and seal arrangement for the cover and the case;

FIG. 5 is an enlarged fragmentary elevation view of the stop for the thread of the case;

FIG. 6 is an enlarged fragmentary elevation view taken along the line 6—6 in FIG. 5 and further showing the thread stop;

FIG. 7 is an enlarged fragmentary horizontal section view taken along the line 7—7 in FIG. 5 and further showing the thread stop of the case;

FIG. 8 is an enlarged fragmentary horizontal section view taken along the line 8—8 in FIG. 6 and further showing the indicating window of the cover;

FIG. 9 is an enlarged fragmentary elevation view showing the stop of the case as seen through the window of the cover when the case and cover are in their fully engaged position;

FIG. 10 is an enlarged horizontal section view taken along the line 10—10 in FIG. 9 and further showing the case and cover in their fully engaged position; and FIG. 11 is a fragmentary vertical section view of the case portion of the filter housing showing the threaded nipple secured to the case bushing.

Housing 20 for filter element 21 includes case or container 22 having body portion 22a and base portion 22b (FIG. 1). Case 22 can be provided with its elongated cylindrical form by deep drawing which results in the wall thickness of the case increasing from base portion 22b toward end portion 22c adjacent to the opening of the case. The end portion therefore has the thickest wall section of the case. This can be shown by way of an example in which a case formed in accordance with the invention has a base portion of approximately .032", the portion of body portion 22a adjacent to the base portion of approximately .037″, and the end portion adjacent to threads 23 of approximately .042″.

The advantage of the increase in wall thickness is that it places the thicker portion of the wall at the end portion where threads 23 are rolled. The threads are coarse and proportioned with large radii in order to obtain an appreciable degree of strength and to avoid stress concentrations in the case (FIG. 4). Adjacent to the openings of the case there is provided flange 24 which extends inwardly toward the interior of the case. The flange serves to stiffen the case adjacent to the opening and thereby insure that it is maintained in its cylindrical form.

Cover 25 for case 22 includes base portion 25a and flange portion 25b extending therefrom. Flange portion 25b contains threads 26 formed therein by rolling and corresponding to threads 23 with which they are adapted to engage. The installation of cover 25a about the threaded end portion of the case is facilitated by the presence of radius 24a adjacent to flange 24 since the radius provides a curved surface over which end portion 26a of threads 26 can readily pass (FIG. 4). When the installation of the cover is completed, radius 24a of the flange is adjacent to shoulder 25c of the flange of the cover.

In order to seal the cover with respect to the case, flange 25b of the cover is provided with annular groove 27 in which seal ring 28 is disposed. Before the cover is installed the seal ring can extend partially out of the annular groove toward the center of the cover. As the cover is being screwed onto the case, seal ring 28 contacts flange 24 and slides over radius 24a and passes onto the outer surface of the case. Thus, the radius prevents any damaging interference of the case with the seal ring and aids in its passage onto the outer surface of the case. Once in contact with the outer surface of the end portion of the case, the seal ring is compressed into the annular groove and tightly seals the cover to the case. With this arrangement, the pressured fluid within housing 20 is blocked from passing into the region between the threads of the case and the cover where it could otherwise tend to spread the threads apart from one another. Due to the smooth external outer surface of the case and the radius at flange 24, the cover can be repeatedly installed and removed without damaging the seal ring.

Flange portion 25b of the cover is provided with a plurality of flats or faces 29 disposed in the manner of a polygon about the circumference of the cover. Faces 29 provide a gripping surface for the hand of the individual in order that he may apply sufficient torque to the cover whenever it is being installed or removed from the case. In addition, the faces serve to stiffen and strengthen the flange portion of the cover.

Base portion 25a of the cover adjacent to its central region is deformed inwardly to provide seat 25d which pilots spring 30 against end plate 31 of filter element 21 for urging the element toward the base portion of the housing. The presence of seat 25d in the base portion of the cover serves to stiffen the cover and counteract any tendency of the base portion of the cover to deflect as a diaphragm. Seat 25d can be provided with locally upset portion 25e which engages spring 30 and retains it in place on the seat.

Base portion 22b of the case includes inner conical surface 22c and outer conical surface 22d which are connected by ring portion 22e (FIGS. 1 and 2). With this arrangement the base portion is in the form of a concentrically convoluted surface. Outer conical surface 22d can be provided with stiffening ribs 22d′. At the center of the base portion of the case there is provided bushing 32 having flange 32a swaged over the inner edge of inner conical portion 22c. Bushing 32 includes shoulder 32b upon which tube 33a extending from end plate 33 of the filter element is supported. End plate 33 as well as tube 33a of the filter element is sealed with respect to bushing 32 by means of gasket 34 which is compressed between the end plate and conical portion 22c as sleeve 33a is urged against shoulder 32b of the bushing.

The means for passing a flow of fluid to be filtered with respect to the interior of the case are a plurality of inlet ports 35 which are formed by punching tongues 35a from inner conical portion 22c (FIGS. 1 and 2). The tongues form an annular groove with respect to ring portion 22e in which is disposed gasket 36. The gasket serves as the means for enclosing the inlet ports and sealing the base portion of the case with respect to mounting surface 37 having inlet passage 38 in fluid communication with inlet ports 35.

The means for threadedly attaching the case at its bottom portion to the mounting surface includes threaded nipple 39 engaged with the threads within central opening 32c of the bushing and discharge passage 40 of mounting surface 37. With this arrangement, the fluid such as the lubricant of an internal combustion engine flows from a source such as the engine oil pump and then through passage 38 which delivers pressured oil to inlet ports 35. The oil then passes around end plate 33 and into the region between the inner surface of the container and the outer surface of filter element 21. After flowing through the filter element the oil passes through openings 41a in center tube 41 into central cavity 42 which leads to nipple 39 and discharge passage 40.

If the resistance to flow of element 21 is excessive due to clogging by foreign matter, excessively viscous oil at a low temperature condition or the like, relief valve 31a biased by spring 31b, by-passes the flow into cavity 42. Retainer 31c for the relief valve can be attached to the end plate 31 by dimpling the material of the end plate through openings in flange 31d of the retainer and then flattening the dimpled material into the form of rivet 31e to secure the retainer to the end plate.

Threaded nipple 39 can be anchored within the mounting surface so that bushing 32 with the container is installed by screwing them onto the nipple. On the other hand, nipple 39 can be threaded into bushing 32 and staked into place at end portion 39a so that it remains permanently installed therein (FIG. 11). Thus it can be seen that the bushing in the container of the invention is simply adapted for use with mounting surfaces which either have or do not have nipple 39.

During installation the container is rotated in order to screw the threaded nipple either into the mounting surface or onto the bushing, as the case may be, until gasket 36 is compressed against the mounting surface to an extent corresponding to a predetermined level of torque. Installation can be preformed by gripping the container by hand, gripping the cover by hand, the use of a band wrench about the housing, or by applying a socket wrench device which is adapted to engage faces 29 of the cover. Once the housing is installed upon the mounting surface, the frictional engagement of gasket 36, due to the fact that it engages the surface at an appreciable distance from the center line of the pipe nipple, can develop an appreciable restraining torque. In this way, the filter housing is secured to the mounting surface in a manner which prevents it from being inadvertently unscrewed during subsequent removal of the cover. Consequently, whenever the cover is to be removed there is no need to hold the container in order to prevent the unscrewing of the housing from the mounting surface.

The land portion at termination 23a of threads 23 on the outer surface of case 22 is in the form of a step or stop 43 (FIGS. 5 and 7). Thus, stop 43 is at the termination of thread 23 nearest to the end portion of the case having flange 24. Termination 26b of thread 26 of the cover is provided with opening or window 44 which extends through the cover (FIGS. 6 and 8). When the cover is installed upon the case, the thread at end portion 26a of the cover is aligned with stop 43 and the cover is rotated with respect to the case in order to thread the cover and case together. When the cover arrives at its fully installed position (FIGS. 9 and 11) edge portion 44a of window 44 intersects stop 43 and further relative motion of the cover with respect to the case is prevented. This arrangement safeguards the cover from being installed with excessive torque which could possibly otherwise damage the engaged threads. By means of window 44 the operator obtains a visual indication that the cover is fully installed by observing the presence of stop 43 and termination 23a in the window. The window arrangement also provides for visual inspection for determining at any time whether the cover is fully engaged with the case.

In another embodiment of the invention, bottom portion 22b of the case 22 is provided with bushing 45. Flange 45a of the bushing is swaged over the inner edge of inner conical portion 22c. Shoulder 45b of the bushing supports edge 46a of anti-drain back valve 46 which is fabricated from a flexible material in the form of a disc having a central opening. Valve 46 is deflected by the flow of fluid in the manner of a diaphragm from engagement with seat 22f which is formed at the line of junction between conical portion 22c and ring portion 22e. The engagement of the valve with seat 22f in the closed position deflects the valve and due to the resiliency of the valve material, the valve is biased against the seat.

End plate 47 of filter element 48 is provided with tube 49 having flange 49a which bears upon edge 46a of the valve and thus serves both to support the filter element and to retain the valve in place upon shoulder 45b of the bushing.

Bushing 45 is provided with threads 45c for engaging the filter housing to the threaded passage in the mounting surface. Interior portion 45d of the bushing contains ball valve 50 which is urged against seat 45e by spring 51 supported in the bushing by retainer 52. With the arrangements of valves shown in FIG. 3 it can be understood that whenever the delivery of pressured fluid to the filter housing is terminated, such as when the engine is shut down, valve 46 is no longer forced open away from seat 22f by the flow of fluid and consequently closes. The termination of the flow of fluid through interior 45d of the bushing enables spring 51 to close ball valve 50 onto seat 45e. The result is that the filter housing is sealed or closed at both of its passages from the passages in the mounting surface which are connected to the flow system of the engine. The advantage of this arrangement is that it prevents the lubricant present within the filter during operation from draining from its during the shut down period. Otherwise when the filter is mounted in a position to permit draining, the filter would empty during the shut down period. Subsequently upon restarting the engine, a quantity of lubricant would necessarily have to be pumped into the filter before the normal operating pressure of the oil system could be obtained.

From the foregoing specification it can be seen that by means of the threaded nipple, the filter housing of the invention can be conveniently engaged to a mounting surface. Upon screwing the filter housing into its final installed position on the mounting surface, the gasket at its bottom portion is brought into a sealing contact with the mounting surface. Once installed, the frictional engagement of the filter housing by virtue of the threaded connection and that of the gasket in its base portion are sufficient to secure the filter housing in place upon the mounting surface in spite of the application of the torque necessary for the installation and the removal of the cover.

By means of the seal ring in the annular groove of the cover, the cover is sealed to the case independently of the threads. Thus, the threads need only serve to withstand the separating force applied to the cover and case by the pressure within the housing. Since the seal ring engages the outside surface of the case and the annular groove in the cover, it is forced against both of these members by the internal pressure applied to the housing. As the internal pressure increases, the seal ring is pressed tighter against the case and groove.

In addition, by being disposed in the annular groove and in engagement with the exterior of the case, the seal ring locks the cover with respect to the case and prevents loosening of the threads even when subjected to severe vibration.

The thread stop and window arrangement give a clear visual indication that the cover has been properly installed with respect to the case and that the threads are fully engaged. This function safeguards the cover from being installed in an excessively tight condition which could otherwise result in damage to the threads. Furthermore, by limiting the extent of engagement of the cover with the case, the breakaway torque necessary to remove the cover can be held to a minimum value. So long as the breakaway torque for the cover is held to a value less than that necessary to unscrew the case from the mounting surface, the case will not be inadvertently unscrewed when attempting to unscrew the cover. For example, the case can be adapted to be installed with a torque of about 10–12 ft.-lbs. while the cover can be adapted to be installed on the case with a torque of about 4–5 ft.-lbs.

Both the cover and case of the filter housing can be formed by drawing operations and, therefore, they can be fabricated from relatively thin material in a convenient and economical way.

What is claimed:

1. A housing for a filter device comprising a container of thin gauge metal having a filter device operatively disposed within the interior portion of said container, said container having an opening providing access to said interior portion, said container having a portion extending adjacent to said opening containing a series of continuous rolled threads, the end portion of said rolled threads adjacent to said opening extending at an angle to the outer surface of said container to form a stop, inlet and outlet means for passing a flow of fluid to be filtered with respect to the interior of said container, and a cover of thin gauge metal for closing said opening, said cover having a base portion for closing said opening and a flange portion extending from adjacent the periphery of said base portion, said flange containing an additional series of continuous rolled threads for engagement with the rolled threads of said container at the outer surface thereof, the end portion of said additional series of rolled threads last to approach the rolled threads of said container during engagement therewith being adapted to intersect said stop, said end portion of said additional thread having an opening extending through said cover to indicate when said end portion intersects said end portion of the rolled thread of said container.

2. A housing for a filter device comprising structure forming a container of thin gauge metal and having a filter device operatively disposed within the interior portion of said container, said container having an opening providing access to said interior portion, said container having a portion extending adjacent to said opening containing a series of continuous rolled threads, the end portion of said rolled threads adjacent to said opening extending approximately at right angles to the outer surface of said container to form a stop, inlet and outlet means for passing a flow of fluid to be filtered with respect to the interior of said container, a cover of thin gauge metal having a base portion for closing said opening and a flange portion extending from adjacent the periphery of said base portion, said flange portion having an end portion containing an additional series of continuous rolled threads for engagement with the rolled threads of said container at the outer surface thereof, the end portion of said additional rolled threads last to approach the rolled threads of said container during engagement therewith being adapted to intersect said stop, said end portion of said series of additional thread having an opening extending through said cover to indicate when said end portion intersects said stop, said flange portion having an annular groove extending within the inner surface thereof and disposed between the rolled threads of said flange portion and said base portion, and a seal member disposed in said groove for sealing said cover to the outer surface of the container when said cap is threadedly engaged to said container, whereby the extent of engagement of said cover and container are limited.

3. A housing for a filter device comprising structure forming a container of thin gauge metal and having a base portion and a body portion extending therefrom, said body portion having an opening providing access to the interior of said container, a filter device operatively disposed in said interior of said filter device, a portion of the outer surface of said body portion adjacent to said opening being roll threaded with a series of continuous threads, the end portion of the rolled threads of said container adjacent to said opening thereof extending at an angle to the outer surface of said container to form a stop inlet and outlet means disposed on said base portion for passing a flow of fluid to be filtered with respect to the interior of said container, means for threadedly attaching said base portion to a mounting surface having passages in fluid communication with said fluid flow passing means, gasket means enclosing said fluid flow passing means for sealing said base portion to said mounting surface, a cover of thin gauge metal having a base portion for closing the opening in said body portion and a flange portion extending from adjacent the periphery of said base portion, the inner surface of said flange portion being roll threaded with a series of continuous threads for engagement to said threaded portion of the outer surface of said body portion, the end portion of the rolled threads of the inner surface of said flange portion last to approach the rolled threads of said container during engagement therewith being adapted to intersect said stop, said flange portion having an annular groove extending within the inner surface thereof and disposed between the threads of said flange portion and said base portion, and a seal member disposed in said groove for sealing said cover to said outer surface of the container when said cover is threadedly engaged to said container, whereby said attaching means and said gasket means oppose relative movement of said housing with respect to the mounting surface when said cover is moved with respect to said threaded portion of said body portion.

4. A housing for a filter device comprising structure forming a container of thin gauge metal and having a filter device operatively disposed within the interior portion of said container, said container having an opening providing access to said interior portion, an annular flange extending from said container toward said interior portion adjacent said opening, a portion of the outer surface of said container adjacent to said opening being roll threaded with a series of continuous roll threads, the end portion of the rolled threads of said container adjacent to said opening thereof extending at an angle to the outer surface of said container to form a stop inlet and outlet means for passing a flow of fluid to be filtered with respect to the interior of said container, a cover of thin gauge metal having a base portion for closing said opening and a flange portion extending from adjacent the periphery of said base portion, the inner surface of said flange portion being roll threaded with a series of continuous threads for engagement to said threaded portion of the outer surface of the container, the end portion of the rolled threads of the inner surface of said flange portion last to approach the rolled threads of said container during engagement therewith being adapted to intersect said stop, said flange portion having an annular groove extending within the inner surface thereof and disposed between the threads of said flange portion and said base portion, and a seal member disposed in said groove for sealing said cover to said outer surface of the container when said cover is threadedly engaged to said container.

References Cited
UNITED STATES PATENTS

| | | | |
|---|---|---|---|
| 2,180,357 | 11/1939 | Hothersall | 220—39 |
| 2,241,381 | 5/1941 | Hothersall | 220—39 |
| 2,463,137 | 3/1949 | Bahlke | 210—454 X |
| 2,568,181 | 9/1951 | Zimmerman et al. | 210—435 |
| 3,000,506 | 9/1961 | Hultgren | 210—1.0 |
| 3,036,711 | 5/1962 | Wilhelm | 210—1.0 |
| 3,070,232 | 12/1962 | Casaleggi | 210—444 X |
| 3,187,896 | 6/1965 | Wilkinson | 210—443 X |

REUBEN FRIEDMAN, *Primary Examiner.*

F. W. MEDLEY, *Assistant Examiner.*